United States Patent
Zhang

(10) Patent No.: US 9,051,971 B2
(45) Date of Patent: Jun. 9, 2015

(54) OIL-MIST-FREE AND HIGH-SPEED ELECTRIC SPINDLE

(75) Inventor: Leizhen Zhang, Shanghai (CN)

(73) Assignee: Shanghai YJ Bearing Manufacture Co., Ltd., Songjiang District, Shanghai (CN)

(*) Notice: Subject to any disclaimer, the term of this patent is extended or adjusted under 35 U.S.C. 154(b) by 0 days.

(21) Appl. No.: 13/505,456

(22) PCT Filed: Feb. 23, 2012

(86) PCT No.: PCT/CN2012/071517
§ 371 (c)(1),
(2), (4) Date: May 2, 2012

(87) PCT Pub. No.: WO2013/123659
PCT Pub. Date: Aug. 29, 2013

(65) Prior Publication Data
US 2014/0355919 A1    Dec. 4, 2014

(51) Int. Cl.
*F16C 33/80* (2006.01)
*B23Q 1/70* (2006.01)
*B23Q 11/00* (2006.01)
*B23Q 11/08* (2006.01)
*F16C 33/76* (2006.01)
*F16C 33/66* (2006.01)
*C10M 115/08* (2006.01)
*F16C 19/06* (2006.01)

(52) U.S. Cl.
CPC . *F16C 33/80* (2013.01); *B23Q 1/70* (2013.01); *B23Q 11/0078* (2013.01); *B23Q 11/0883* (2013.01); *F16C 33/767* (2013.01); *F16C 33/6633* (2013.01); *F16C 19/06* (2013.01); *C10M 115/08* (2013.01); *C10M 2215/1026* (2013.01); *C10N 2220/082* (2013.01); *C10N 2230/30* (2013.01); *C10N 2240/02* (2013.01); *C10N 2250/10* (2013.01); *F16C 33/6603* (2013.01)

(58) Field of Classification Search
CPC .............................. F16C 33/80; F16C 33/6633
USPC ................................................... 384/480, 462
See application file for complete search history.

(56) References Cited

U.S. PATENT DOCUMENTS

| | | | | |
|---|---|---|---|---|
| 3,679,278 A | * | 7/1972 | Lucas | 384/480 |
| 4,895,460 A | * | 1/1990 | Grzina | 384/132 |
| 5,722,779 A | * | 3/1998 | Kameyama | 384/478 |
| 2004/0175065 A1 | * | 9/2004 | Nguyen | 384/480 |
| 2006/0053972 A1 | * | 3/2006 | Liu et al. | 75/373 |
| 2006/0056752 A1 | * | 3/2006 | Tibbits | 384/462 |
| 2008/0161213 A1 | * | 7/2008 | Jao et al. | 508/165 |

\* cited by examiner

*Primary Examiner* — Thomas R Hannon

(57) ABSTRACT

An oil-mist-free and high-speed electric spindle of the present invention includes a shell, a stator and a rotator. Using a bearing provided on a bearing providing position of the shell, the stator and the rotor are separated by a gap and freely rotatably supported on the shell. A labyrinth sealing structure, which covers the bearing providing position, is provided on an outside of the bearing providing position. The labyrinth sealing structure has a channel which opens to an atmosphere. And a through-hole is provided on the shell, wherein one end of the through-hole opens to the shelter, and the other end of the through-hole is connected with the channel of the labyrinth sealing structure. And the bearing providing position is filled with a lubricating grease which is a total synthesis grease of polyurea that is mainly composed of a base oil and contains a nanometer anti-wear additive.

18 Claims, 5 Drawing Sheets

OIL-MIST-FREE AND HIGH-SPEED ELECTRIC SPINDLE

CROSS REFERENCE OF RELATED APPLICATION

This is a U.S. National Stage under 35 USC 371 of the International Application PCT/CN2012/071517, filed Feb. 23, 2012.

BACKGROUND OF THE PRESENT INVENTION

1. Field of Invention

The present invention relates to a high-speed electric spindle, and more particularly to an oil-mist-free and high-speed electric spindle in a bearing processing industry.

2. Description of Related Arts

An electric spindle, which is a short name of a high frequency spindle, is sometimes called a direct drive spindle as well. The electric spindle is a spindle unit of a built-in motor. The electric spindle shortens the length of a main transmission chain of a machine tool to zero, and accomplishes a result of "zero transmission" of the machine tool. The electric spindle has advantages of compact structure, high mechanical efficiency, availability of extremely high rotating speed, high rotating accuracy, low noise, small oscillation, and etc. Thus, the electric spindle is more and more widely used in a modern machine tool, especially a numerical control machine tool. And the electric spindle is particularly commonly applied to a bearing manufacturing industry.

Depending on the rotating speed of a spindle, electric spindles are classified as a low-speed electric spindle and a high-speed electric spindle. The high-speed electric spindle generally refers to the electric spindle with a bearing whose DN value reaches to 1~2 million thereof. Since a spindle bearing of the high-speed electric spindle is in a sharply high-speed friction condition, and withstands a high temperature and high load, the lubrication thereof is very important.

The high-speed electric spindle produces large amounts of heat while in operation, which causes a temperature rising thereof. Thus, unlike the low-speed electric spindle, the high-speed spindle does not use a grease lubrication, but an oil-mist lubrication, an oil-air lubrication or a spray lubrication. That is because in the grease lubrication, the grease is not capable of being maintained in the bearing. The so called oil-mist lubrication means using a compressed air which is purified to spray a dedicated oil into a mist condition via a dedicated spraying device; and using the compressed air to forcefully put the oil mist into the bearing portion of the electric spindle so as to lubricate the high-speed bearing. While using the oil-mist lubrication for lubricating, a manufacture of the compressed air consumes huge energy. And each electric spindle on average requires being equipped with an air compressor of 2~2.5 kw, which consumes a lot of power; and each electric spindle on average requires 1~2 kg spindle dedicated oil, which consumes a lot of oil. Furthermore, in the oil-mist lubrication mode, the oil mist is instantly discharged into the air after passing through the bearing of the electric spindle, which causes a serious environmental pollution and harms a physical condition of the employee as well.

On the other hand, because a rotating speed of the high-speed electric spindle reaches to sixty thousands per minute or more, and a DN value of the bearing reaches to 1~2 million, it is not possible to use a contact sealing structure. For example, while applying the conventional electric spindle which uses non-contact seal structure to a bearing grinder, if a mist-and-air lubrication is closed, there is no positive-pressure compressed air in the electric spindle. The operating of the bearing grinder is coupled with a spraying or sputtering of plentiful coolant which contains grinding iron filings, threshings of a grinding wheel and sundries that are capable of entering into the bearing of the electric spindle, so a force exerted on the bearing varies, which causes problems that the spindle generates abnormal sounds or even stops rotating, so that a motor coil is burnt out. When using a liquid coolant, the harm is more serious.

At the same time, as the non-contact sealing structure uses a gas or liquid tension between two surfaces to achieve a sealing effect, a space of two relatively moving elements must be controlled in a certain range. If the space is too small, a slight impact in operation damages the bearing easily; and if the space is too large, the sealing is ineffective.

SUMMARY OF THE PRESENT INVENTION

The present invention is accomplished in view of the problems mentioned above. An object of the present invention is to provide a high-speed electric spindle which is capable of avoiding an environmental pollution caused by an oil mist, avoiding harming a physical health of an employee, and saving energy.

In addition, another object of the present invention is to provide an oil-mist-free and high-speed electric spindle which is capable of effectively preventing external particles from entering into a bearing in a high-speed rotating condition.

In order to achieve the objectives mentioned above, a first aspect of the present invention provides an oil-mist-free and high-speed electric spindle comprising a shell, a stator and a rotor, wherein the stator and the rotor are received by a shelter which is formed by an inner surface of the shell, wherein the stator and the rotor are separated by a gap and freely rotatably supported on the shell via a bearing provided on a bearing providing position of the shell, wherein the bearing providing position is filled with a lubricating grease which is a total synthesis grease of polyurea that is mainly composed of a base oil and contains a nanometer anti-wear additive.

In addition, a second aspect of the present invention provides the oil-mist-free and high-speed electric spindle comprising the shell, the stator and the rotor, wherein the stator and the rotor are received by a shelter which is formed by the inner surface of the shell, wherein using the bearing provided on a bearing providing position of the shell, the stator and the rotor are separated by the gap and freely rotatably supported on the shell, wherein a labyrinth sealing structure, which covers the bearing providing position, is provided on an outside of the bearing providing position, wherein the labyrinth sealing structure has a channel which opens to an atmosphere, wherein a through-hole is provided on the shell, wherein one end of the through-hole opens to the shelter, and the other end of the through-hole is connected with the channel of the labyrinth sealing structure, wherein, preferably, the bearing providing position is filled with lubricating grease which is the total synthesis grease of polyurea that is mainly composed of the base oil and contains the nanometer anti-wear additive.

In the first or the second aspect of the present invention oil-mist-free and high-speed electric spindle, preferably, the base oil is vegetable oil, an animal oil, a mineral oil or a synthetic oil; and the nanometer anti-wear additive is preferred nanometer-Cu particles.

In the first or the second aspect of the present invention oil-mist-free and high-speed electric spindle, preferably, a weight of the nanometer anti-wear additive accounts for 3~8% of a total weight of the lubricating grease.

In the first or the second aspect of the present invention oil-mist-free and high-speed electric spindle, preferably, the labyrinth sealing structure is a multi-sectional labyrinth sealing structure.

In the first or the second aspect of the present invention oil-mist-free and high-speed electric spindle, preferably, the shell comprises a main shell body, a front cover and a rear cover, wherein the front cover and the rear cover are mounted on both ends of the main shell body, wherein bearing holes are respectively provided on the front cover and the main shell body to serve as the bearing providing position, wherein the labyrinth structure, which covers the bearing hole of the front cover, is provided on the front cover.

In the first or the second aspect of the present invention oil-mist-free and high-speed electric spindle, preferably, the labyrinth sealing structure comprises an external sealing part and an internal sealing part, wherein the internal sealing part which covers the bearing providing position is mounted on the outside of the bearing providing position, wherein the external sealing part which covers the internal sealing part is mounted on an outside of the internal sealing part, wherein the channel consists of a first channel and a second channel which are communicated with each other, wherein the first channel is formed on the internal sealing part, the second channel is formed by a space between two opposite surfaces of the internal sealing part and the external sealing part, and one end of the second channel communicates with the atmosphere, and the other end of the through-hole opens to the first channel.

In the first or the second aspect of the present invention oil-mist-free and high-speed electric spindle, preferably, the bearing is a member selected from the group consisting of an angular contact bearing, a deep groove ball bearing, an angular contact roller bearing and a radial short cylindrical roller bearing.

In the first or the second aspect of the present invention oil-mist-free and high-speed electric spindle, preferably, a diameter of the channel and the through-hole is 0.10~0.20 mm.

According to the first aspect of the present invention oil-mist-free and high-speed electric spindle, the bearing providing position is filled with the lubricating grease which is the total synthesis grease of polyurea that is mainly composed of the base oil and contains the nanometer anti-wear additive. Consequently, on the bearing providing position and in a frictional heating condition, a ferrous metal is capable of generating a friction-reducing and anti-wear ceramic combined film. Depending on the friction-reducing and anti-wear ceramic combined film, a friction force and a friction heat are greatly reduced, in such a manner that the lubricating grease that fills the bearing providing position is hard to volatilize and easy to be maintained in the bearing providing position for a long time, which solves a former problem that the high-speed electric spindle generates great heat during working and thus is not capable of being applied with the lubricating grease. Since a conventional oil-mist lubricating is not used, an environmental pollution caused by the oil-mist is effectively avoided, and a large amount of energy is saved.

According to the second aspect of the present invention oil-mist-free and high-speed electric spindle, the labyrinth sealing structure is provided on the outside of the bearing providing position, the labyrinth sealing structure has the channel which opens to the atmosphere, the through-hole is provided on the shell, wherein one end of the through-hole opens to the shelter, and the other end of the through-hole is communicated with the channel of the labyrinth sealing structure. In such a mannner, the shelter which is formed by the inner surface of the shell is capable of being communicated with an outer atmosphere via the channel and the through-hole, so as to prevent forming a negative pressure in the shelter during an operating of the high-speed electric spindle, which is capable of effectively preventing external particles from sneaking into the bearing of the high-speed electric spindle and significantly extending a service life of the electric spindle, wherein a rating life designed of the electric spindle reaches to 2000 hours, which equates to 4~5 times of a service life of a common oil-mist lubricating electric spindle. At the same time, the labyrinth sealing structure is capable of preventing a leakage of a lubricating oil.

DETAILED DESCRIPTION OF THE PREFERRED EMBODIMENT

Further description is illustrated combined with accompanying drawings according to a preferred embodiment of the present invention.

Figure 1:
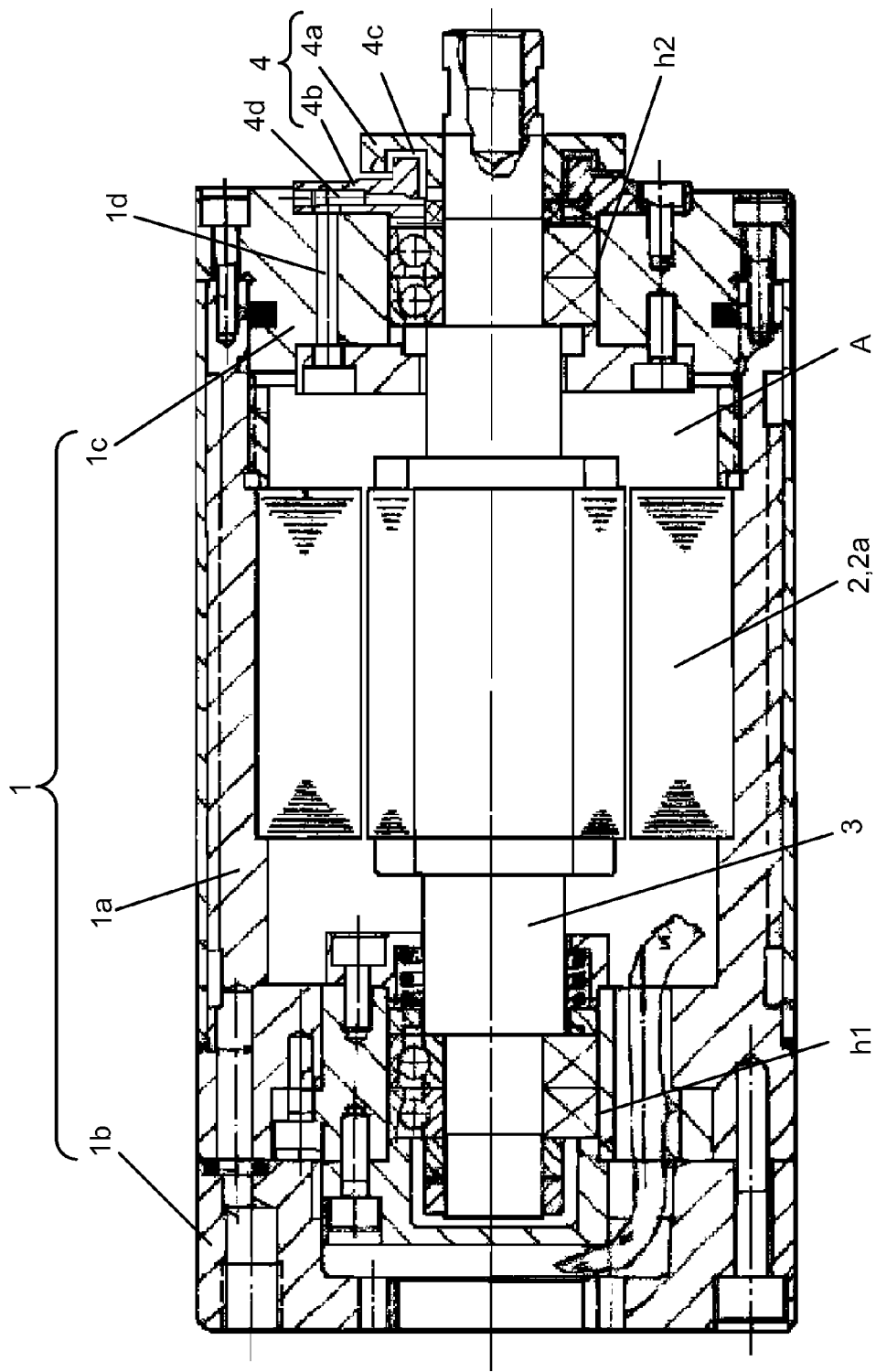
FIG. 1 is a sectional view of a electric spindle of the present invention.

FIG. 1 is a sectional view of an electric spindle of the present invention, wherein character number 1 refers to a shell body of an electric spindle, which approximately appears in a shape of a cylinder and is longer in an axial direction, i.e., a left to right direction of FIG. 1. The shell body 1 is composed of a main shell body 1a, a rear cover 1b and a front cover 1c. The main shell body 1a appears in a shape of a half-opened cylinder with a bottom, and comprises a cylinder part which approximately appears in the shape of the cylinder and the bottom which is mounted on one end, i.e., the left end of FIG. 1, of the cylinder part. On the bottom mentioned above, a bearing hole h1 is provided on an inner surface of the shell body 1 in a radial direction thereof, i.e., an up and down direction of FIG. 1. The rear cover 1b approximately appears in a shape of a hat, which is installed on and covers the bottom of the main shell body 1a. The front cover 1c approximately appears in a shape of a board, which is installed on an opening region, i.e., a right end region of the main shell body in FIG. 1, so as to block up the opening region. In addition, a bearing hole h2 is provided on an inner surface of the front cover 1c in a radial direction thereof as well. In an assembled state, a shell A, which is approximately sealed, is formed in the shell body 1, so as to receive a stator 2 and a rotator 3.

As shown in FIG. 1, a winding 2a of the stator 2 is fixedly mounted on an inner surface of about a middle of the main shell body 1a in an axial direction. A coupling angular contact bearing is provided in the bearing hole h1 of the bottom of the main shell body 1a. In addition, the coupling angular contact bearing is provided in the bearing hole h2 of the front cover 1c. By the bearings mentioned above, the rotator 3 is separated with an inner cycle of the winding 2a by a predetermined gap in a manner of freely rotatably supported on the shell.

In the present invention, the bearing hole h1 and the bearing hole h2 are filled with a lubricating grease which is a total synthesis grease of polyurea that is mainly composed of a base oil and contains a nanometer anti-wear additive, wherein the base oil is a member selected from the group consisting of a vegetable oil, an animal oil, a mineral oil and a synthetic oil; and a proportion of the nanometer anti-wear additive is chosen to account for 3~8% of a total weight of the lubricating grease.

As shown in FIG. 1, a labyrinth sealing structure 4 is provided on a right side of the front cover 1c, and covers the bearing hole h2 thereof. The labyrinth sealing structure 4 is a multi-sectional labyrinth sealing structure, which consists of an external sealing part 4a whose half section approximately appears in a shape of a "C", and an internal sealing part 4b whose half section approximately appears in a shape of an "L". When the external sealing part 4a is integrated with the internal sealing part 4b, a channel 4c is formed between two opposite surfaces of the external sealing part 4a and the internal sealing part 4b, and an end of the channel 4c opens to an atmosphere. In addition, a channel 4d is formed in a portion of the internal sealing part 4b, i.e., an upper portion of FIG. 1. The channel 4d extends in a straight line in a radial direction of the shell body 1, wherein one end of the channel 4d opens to a left side end face of the internal sealing part 4b, and the other end of the channel 4d opens to a cylindrical inner surface of the internal sealing part 4b.

Besides, in the present invention, a through-hole 1d is provided throughout the front cover 1c along an axial direction of the shell body, i.e., the through-hole 1d opens on two end faces of the front cover 1c and the through-hole 1d is communicated with the shelter. When the internal sealing part 4b, which is installed with the external sealing part 4a, is installed on a right side end face of the front cover 1c, the through-hole 1d is communicated with the channel 4d, and the channel 4d is communicated with the through-hole 1d. In such a manner, the shelter A mentioned above is communicated with an outer atmosphere of the electric spindle, so as to eliminate a negative pressure formed in the shelter A mentioned above.

As is mentioned above, in the present invention, the through-hole 1d, which is communicated with the shelter A, is provided on the front cover 1c. And the through-hole 1d is communicated with the atmosphere via the channel 4d and the channel 4c in the labyrinth sealing structure. Therefore, when the present invention electric spindle is installed on devices such as a bearing grinder and rotates in a high-speed, even there is spraying or sputtering of a coolant which contains grinding iron filings, threshings of a grinding wheel and sundries, the grinding iron filings, threshings of a grinding wheel and sundries contained in the coolant can not enter the labyrinth sealing structure, or even the bearing nearer to an inner side of the electric spindle than the labyrinth sealing structure. Therefore, problems that the spindle generates abnormal sounds or even stops rotating caused by a varying of force exerted on the bearing, is avoided.

Besides, the present invention employs a multi-sectional labyrinth sealing structure, so that an entrance of the coolant is effectively avoided.

Exemplary description of the present invention is illustrated combined with accompanying drawings. And it is obvious that the practical implementation of the present invention is not limited to the embodiment mentioned above.

In the embodiment mentioned above, the labyrinth sealing structure consists of, but not limited to, the external sealing part 4a and the internal sealing part 4b, the labyrinth sealing structure can be formed by only one part as well.

In the embodiment mentioned above, the channel 4d provided on the internal sealing part 4b approximately extends in a straight line in a radial direction of the shell body 1. But a shape of the channel 4d is not limited to the straight line, various shapes are adoptable.

In the embodiment mentioned above, the high-speed electric spindle of the present invention comprises but is not limited to the angular contact bearing, and can comprise a magnetic bearing, an oil-based dynamic and static pressure bearing, a deep groove ball bearing, an angular contact roller bearing, and a radial short cylindrical roller bearing to replace the angular contact bearing as well.

In the embodiment mentioned above, the present high-speed electric spindle is adapt for, but not limited to, a bearing grinder, and is applied to other high-speed machine tools such as a high-speed milling machine or a high-speed lathe.

Here is simply illustrated, combined with accompanying drawings, an effect that the multi-sectional labyrinth sealing structure takes in preventing impurity particles from entering into the bearing of the high-speed electric spindle.

Figure 2:
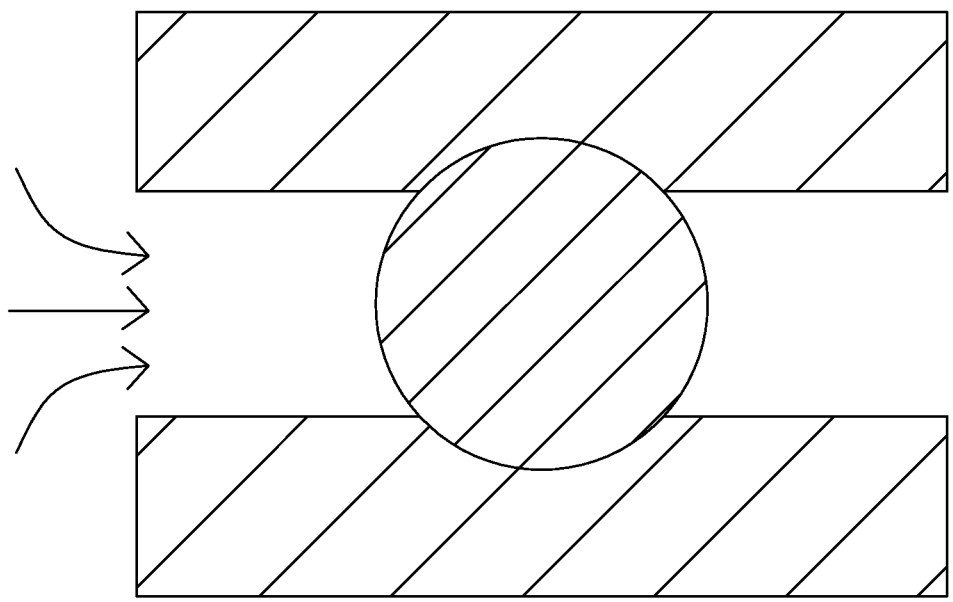
FIG. 2 is an operating condition of an unsealed bearing.
Figure 3:
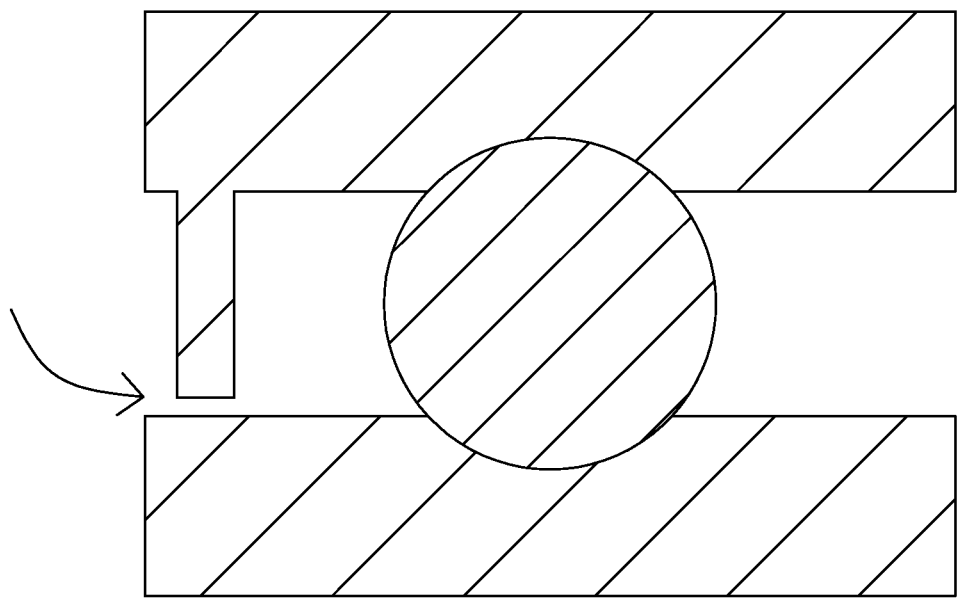
FIG. 3 is an operating condition of a single sealed bearing.
Figure 4:
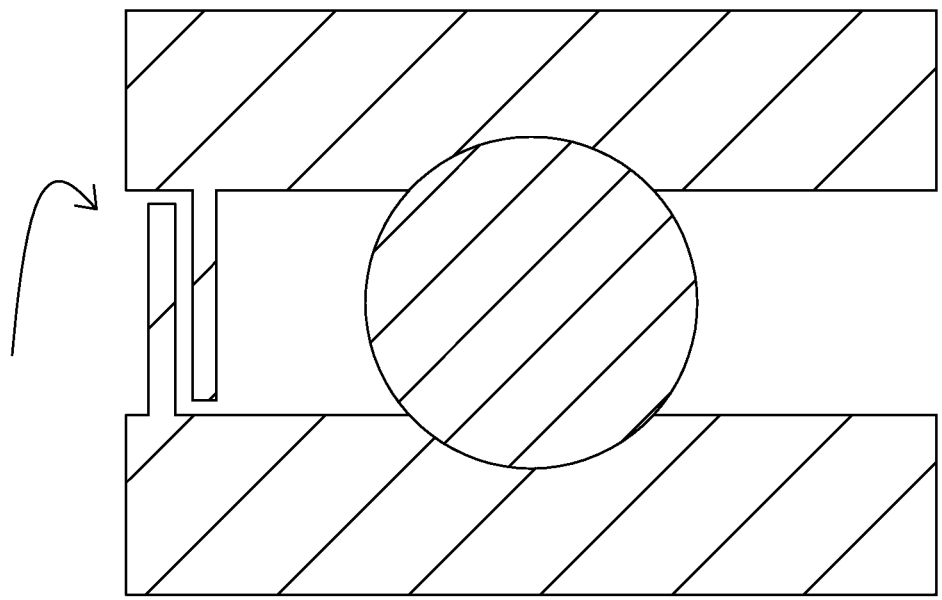
FIG. 4 is an operating condition of a simple labyrinth sealing bearing.
Figure 5:
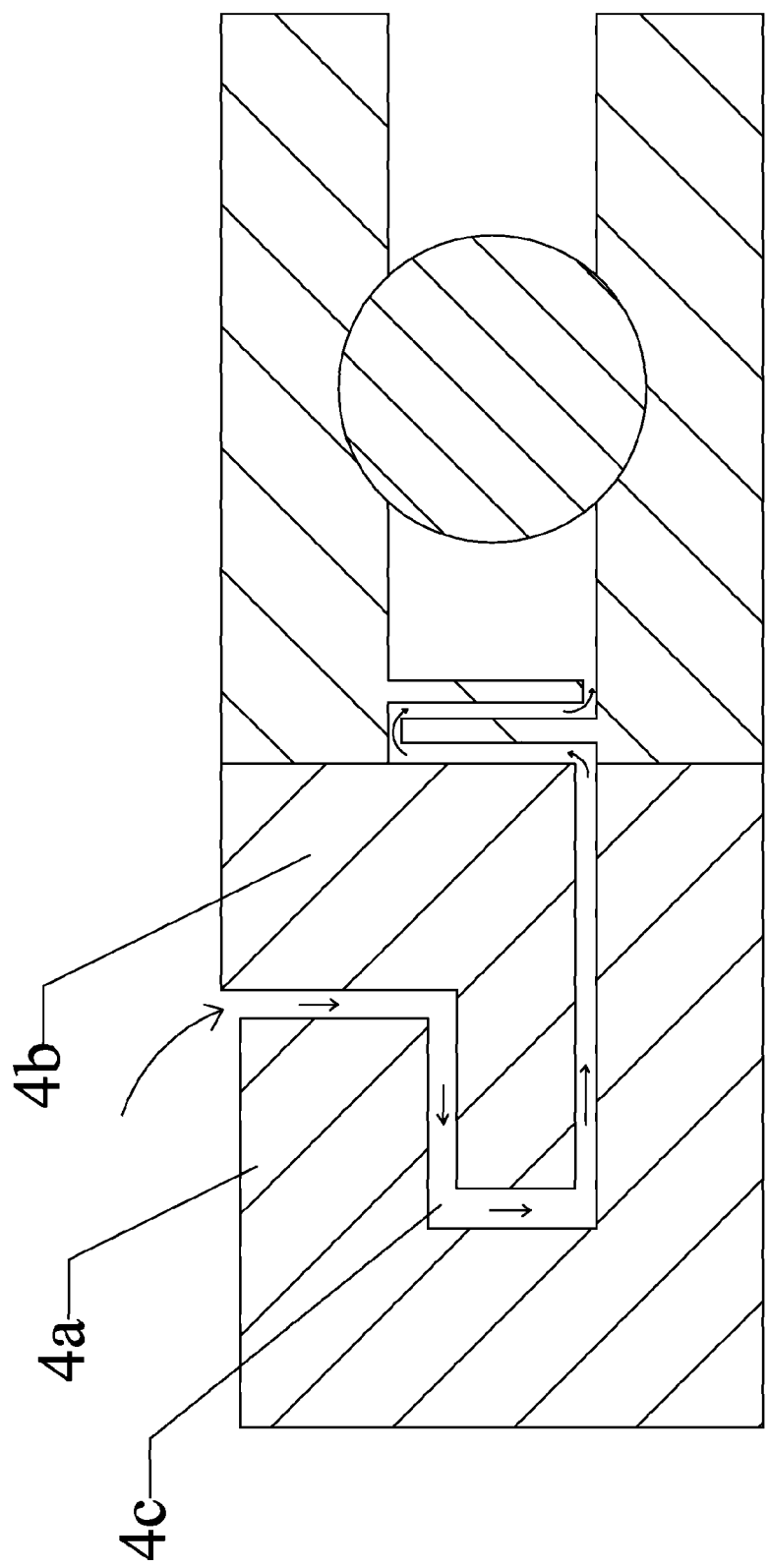
FIG. 5 is a structural view of a multi-sectional sealing structure.

FIG. 2 to FIG. 5 respectively illustrate operating conditions of the bearing, wherein FIG. 2 is an operating condition of an unsealed bearing, FIG. 3 is the operating condition of a single sealed bearing, FIG. 4 is the operating condition of a simple sealed bearing, and FIG. 5 is a structural view of a multi-channeled sealing structure.

As shown in FIG. 2 to FIG. 5, the multi-sectional labyrinth sealing structure in use is capable of effectively preventing the impurity particles from entering the bearing of the electric spindle, and thus prolongs a service life of the electric spindle.

Based on embodiments, we illustrate that a content of the nanometer anti-wear affects on the electric spindle, and a size of the multi-sectional labyrinth sealing structure affects on the service life of the electric spindle as below. By the way, the content of the nanometer anti-wear additive mentioned below refers to a percentage of the nanometer anti-wear additive accounts for in a total weight of the lubricating grease.

Embodiment 1:

Using a total synthesis grease of polyurea, which is mainly composed of the base oil and contains 2% of a nanometer anti-wear additive, it is observed that a lubrication level is insufficient, and that a temperature of the electric spindle can not be controlled effectively.

Embodiment 2:

Using the total synthesis grease of polyurea, which is mainly composed of the base oil and contains 3% of the nanometer anti-wear additive, it is observed that the temperature of the electric spindle is capable of being controlled effectively, and that the temperature is maintained in 139 degrees.

Embodiment 3:

Using the total synthesis grease of polyurea, which is mainly composed of the base oil and contains 6% of the nanometer anti-wear additive, it is observed that the temperature of the electric spindle is capable of being controlled effectively, and that the temperature is maintained in 103 degrees.

Embodiment 4:

Using the total synthesis grease of polyurea, which is mainly composed of the base oil and contains 8% of the nanometer anti-wear additive, it is observed that the temperature of the electric spindle is capable of being controlled effectively, and that the temperature is maintained in 133 degrees.

Embodiment 5:

Using the total synthesis grease of polyurea, which is mainly composed of the base oil and contains 10% of the nanometer anti-wear additive, it is observed that a nanometer material form a cluster which is clustered again 2 hours later after being smashed and fully stirred. The clustered nanometer particles cause noise increasing and vibration value rising, and the temperature of the electric spindle can not be controlled effectively.

Embodiment 6:

The total synthesis grease of polyurea, which is mainly composed of the base oil and contains 6% of the nanometer anti-wear additive, is used. A design life of the electric spindle is 400 hours. And the multi-sectional labyrinth sealing structure as shown in FIG. 5, with a channel 4c of 0.05 mm, is used. No coolant is observed entering into the bearing, several hits are observed in the operating of the electric spindle, and an actual life of the electric spindle is 451 hours.

Embodiment 7:

The total synthesis grease of polyurea, which is mainly composed of the base oil and contains 6% of the nanometer anti-wear additive, is used. A design life of the electric spindle is 400 hours. And the multi-sectional labyrinth sealing structure as shown in FIG. 5, with a channel 4c of 0.10 mm, is used. No coolant is observed entering into the bearing, no hit is observed in the operating of the electric spindle, and the actual life of the electric spindle is 912 hours.

Embodiment 8:

The total synthesis grease of polyurea, which is mainly composed of the base oil and contains 6% of the nanometer anti-wear additive, is used. A design life of the electric spindle is 400 hours. And the multi-sectional labyrinth sealing structure as shown in FIG. 5, with a channel 4c of 0.15 mm, is used. No coolant is observed entering into the bearing, no hit is observed in the operating of the electric spindle, and the actual life of the electric spindle is 2036 hours.

Embodiment 9:

The total synthesis grease of polyurea, which is mainly composed of the base oil and contains 6% of the nanometer anti-wear additive, is used. A design life of the electric spindle is 400 hours. And the multi-sectional labyrinth sealing structure as shown in FIG. 5, with a channel 4c of 0.20 mm, is used. No coolant is observed entering into the bearing, no hit is observed in the operating of the electric spindle, and the actual life of the electric spindle is 986 hours.

Embodiment 10:

The total synthesis grease of polyurea, which is mainly composed of the base oil and contains 6% of the nanometer anti-wear additive, is used. A design life of the electric spindle is 400 hours. And the multi-sectional labyrinth sealing structure as shown in FIG. 5, with a channel 4c of 0.25 mm, is used. No hit is observed in the operating of the electric spindle, but the coolant is observed entering into the bearing, so that the sealing effect is not capable of being reached.

Embodiment 11:

The total synthesis grease of polyurea, which is mainly composed of the base oil and contains 6% of the nanometer anti-wear additive, is used. A design life of the electric spindle is 400 hours. And the simple labyrinth sealing structure as shown in FIG. 4, with a channel 4c of 0.15 mm, is used. No coolant is observed entering into the bearing, no hit is observed in the operating of the electric spindle, and the actual life of the electric spindle is 584 hours.

An experiment result also indicates that, using not the lubricating grease but a conventional lubricating technique, the service life of the electric spindle is not significantly affected; that the labyrinth sealing structure still achieves an expected effect; and that the multi-sectional labyrinth sealing structure has a longer service life than the simple labyrinth sealing structure.

What is claimed is:

1. An oil-mist-free and high-speed electric spindle, comprising a shell, a stator and a rotor, wherein said stator and said rotor are received by a shelter which is formed by an inner surface of said shell, wherein by using a bearing provided on a bearing providing position of said shell, said stator and said rotor are separated by a gap and freely rotatably supported on said shell, wherein a labyrinth sealing structure, which covers said bearing providing position, is provided on an outside of said bearing providing position, wherein said labyrinth sealing structure has a channel which opens to an atmosphere, wherein a through-hole is provided on said shell, one end of said through-hole opens to said shelter, and the other end of said through-hole is connected with said channel of said labyrinth sealing structure, wherein, said bearing providing position is filled with a lubricating grease which is a total synthesis grease of polyurea that is mainly composed of a base oil and contains a nanometer anti-wear additive.

2. The oil-mist-free and high-speed electric spindle, as recited in claim 1, wherein said labyrinth sealing structure comprises an external sealing part and an internal sealing part, said internal sealing part which covers said bearing providing position is mounted on the outside of said bearing providing position, said external sealing part which covers said internal sealing part is mounted on the outside of said internal sealing part, wherein said channel consists of a first channel and a second channel which are communicated with each other, said first channel is formed on said internal sealing part, said second channel is formed by a space between two opposite surfaces of said internal sealing part and said external sealing part, and one end of said second channel opens to the atmosphere, the other end of said through-hole opens to said first channel.

3. The oil-mist-free and high-speed electric spindle, as recited in claim 1, wherein said bearing is selected from the group consisting of an angular contact bearing, a deep groove ball bearing, an angular contact roller bearing and a radial short cylindrical roller bearing.

4. The oil-mist-free and high-speed electric spindle, as recited in claim 1, wherein said base oil is a member selected from the group consisting of a vegetable oil, an animal oil, a mineral oil and a synthetic oil.

5. The oil-mist-free and high-speed electric spindle, as recited in claim 1, wherein said nanometer anti-wear additive is nanometer-Cu particles.

6. The oil-mist-free and high-speed electric spindle, as recited in claim 1, wherein a weight of said nanometer anti-wear additive accounts for 3~8% of a total weight of said lubricating grease.

7. The oil-mist-free and high-speed electric spindle, as recited in claim 1, wherein a diameter of said channel and said through-hole is 0.10~0.20 mm.

8. The oil-mist-free and high-speed electric spindle, as recited in claim 7, wherein a weight of said nanometer anti-wear additive accounts for 3~8% of a total weight of said lubricating grease.

9. The oil-mist-free and high-speed electric spindle, as recited in claim 1, wherein said shell comprises a main shell body, a front cover and a rear cover, wherein said front cover and said rear cover are mounted on both ends of said main shell body, wherein bearing holes are separately provided on said front cover and said main shell body to serve as said bearing providing positions, wherein said labyrinth structure, which covers said bearing holes of said front cover, is provided on an outer side of said front cover.

10. The oil-mist-free and high-speed electric spindle, as recited in claim 9, wherein said labyrinth sealing structure comprises an external sealing part and an internal sealing part, said internal sealing part which covers said bearing providing position is mounted on the outside of said bearing providing position, said external sealing part which covers said internal sealing part is mounted on the outside of said internal sealing part, wherein said channel consists of a first channel and a second channel which are communicated with each other, said first channel is formed on said internal sealing part, said second channel is formed by a space between two opposite surfaces of said internal sealing part and said external sealing part, and one end of said second channel opens to the atmosphere, the other end of said through-hole opens to said first channel.

11. The oil-mist-free and high-speed electric spindle, as recited in claim 9, wherein a diameter of said channel and said through-hole is 0.10~0.20 mm.

12. The oil-mist-free and high-speed electric spindle, as recited in claim 9, wherein a weight of said nanometer anti-wear additive accounts for 3~8% of a total weight of said lubricating grease.

13. The oil-mist-free and high-speed electric spindle, as recited in claim 1, wherein said labyrinth sealing structure is a multi-sectional labyrinth sealing structure.

14. The oil-mist-free and high-speed electric spindle, as recited in claim 13, wherein said labyrinth sealing structure comprises an external sealing part and an internal sealing part, said internal sealing part which covers said bearing providing position is mounted on the outside of said bearing providing position, said external sealing part which covers said internal sealing part is mounted on the outside of said internal sealing part, wherein said channel consists of a first channel and a second channel which are communicated with each other, said first channel is formed on said internal sealing part, said second channel is formed by a space between two opposite surfaces of said internal sealing part and said external sealing part, and one end of said second channel opens to the atmosphere, the other end of said through-hole opens to said first channel.

15. The oil-mist-free and high-speed electric spindle, as recited in claim 13, wherein a diameter of said channel and said through-hole is 0.10~0.20 mm.

16. The oil-mist-free and high-speed electric spindle, as recited in claim 13, wherein a weight of said nanometer anti-wear additive accounts for 3~8% of a total weight of said lubricating grease.

17. The oil-mist-free and high-speed electric spindle, as recited in claim 13, wherein said shell comprises a main shell body, a front cover and a rear cover, wherein said front cover and said rear cover are mounted on both ends of said main shell body, wherein bearing holes are separately provided on said front cover and said main shell body to serve as said bearing providing positions, wherein said labyrinth structure, which covers said bearing holes of said front cover, is provided on an outer side of said front cover.

18. The oil-mist-free and high-speed electric spindle, as recited in claim 17, wherein said labyrinth sealing structure comprises an external sealing part and an internal sealing part, said internal sealing part which covers said bearing providing position is mounted on the outside of said bearing providing position, said external sealing part which covers said internal sealing part is mounted on the outside of said internal sealing part, wherein said channel consists of a first channel and a second channel which are communicated with each other, said first channel is formed on said internal sealing part, said second channel is formed by a space between two opposite surfaces of said internal sealing part and said external sealing part, and one end of said second channel opens to the atmosphere, the other end of said through-hole opens to said first channel.

* * * * *